United States Patent Office 3,539,418
Patented Nov. 10, 1970

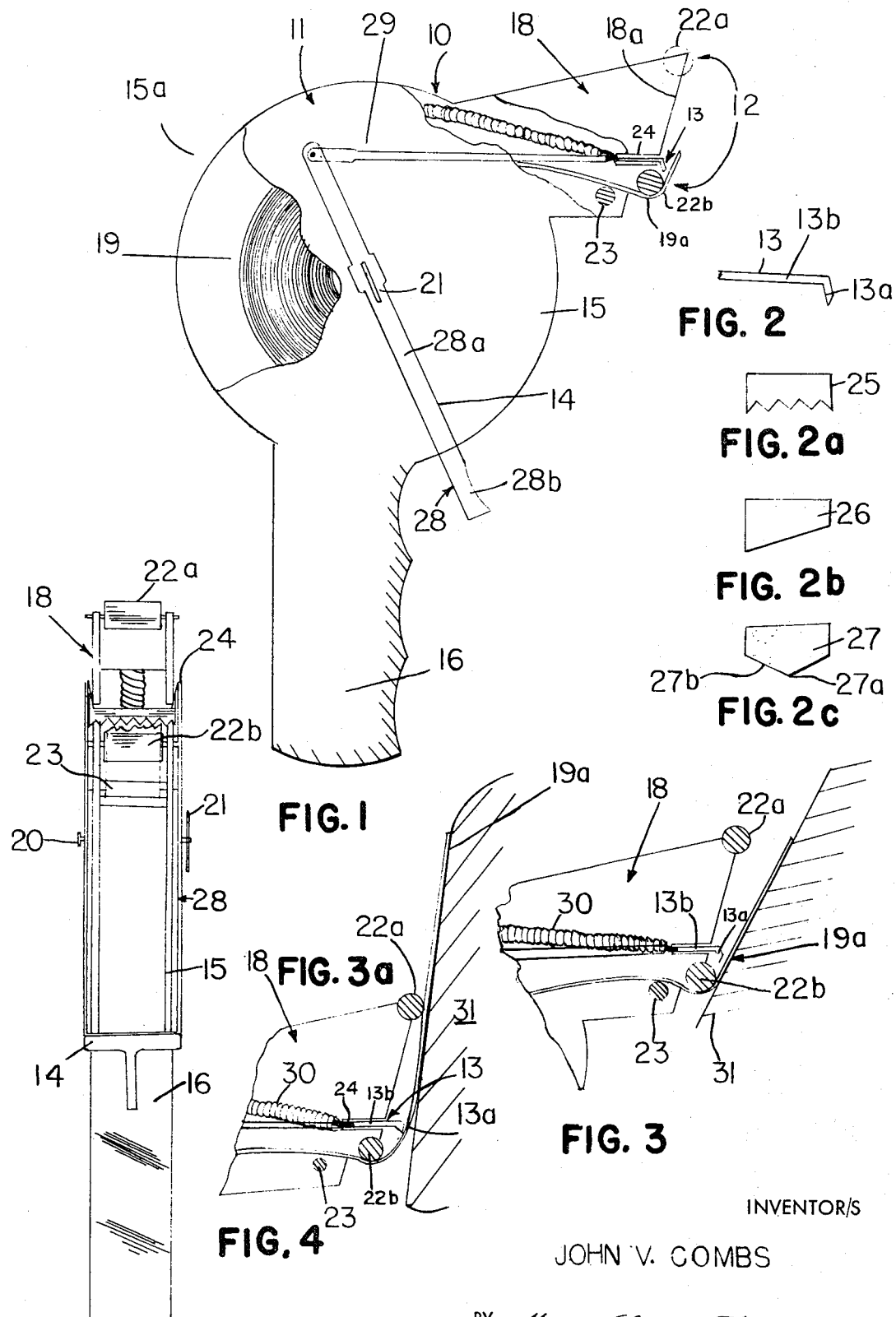

3,539,418
SINGLE HANDED TAPE DISPENSER
John V. Combs, London, Ky., assignor of twenty-five percent to Cecil E. Yeary, London, Ky.
Filed Aug. 24, 1967, Ser. No. 663,001
Int. Cl. B32b 31/18, 31/20
U.S. Cl. 156—523                                    5 Claims

ABSTRACT OF THE DISCLOSURE

A tape dispenser operable with one hand to dispense pressure sensitive adhesive tape from a roll onto a dispensing surface which includes a housing having a handle, a tape storage reservoir and a dispensing end. Dispensing means is associated with the dispensing end to exert pressure on the tape as the tape dispenser is operated, forcing the tape in contact with the dispensing surface, and cutting means is associated with the dispensing means. Triggering means is operatively connected to the cutting means and reciprocably actuates the cutting means between a non-operative position and an operative position to cut the tape after a desired length of tape has been dispensed onto the dispensing surface. After the tape has been cut, the end thereof lies adjacent the dispensing means when tape is not being dispensed.

BACKGROUND OF THE INVENTION

Field of the invention

The invention relates to tape dispensers, and in particular to single handed tape dispensers.

Description of the prior art

Tape dispensers, as such, are not new. Further, the prior art teaches numerous tape dispensers which utilize a trigger activated cutting means. However, the prior art tape dispensers have proven to be unsatisfactory in that a relatively simple single handed tape dispenser having a trigger actuated cutting means has never been developed to dispense pressure sensitive adhesive tape from a roll onto a dispensing surface.

Prior art single handed tape dispensers have also been unsatisfactory in that the operator, of necessity, must always seek out the end of the tape, which has usually dropped inside the dispenser, before the dispensing operation can begin. Thus, in reality, two hands are required to operate prior art single handed tape dispensers.

SUMMARY OF THE INVENTION

This invention discloses a tape dispenser operable with one hand to dispense pressure sensitive adhesive tape from a roll onto a dispensing surface. The dispenser includes a housing having a handle, a tape storage reservoir in which the roll of tape is rotatably mounted, and a dispensing end. Dispensing means are associated with the dispensing end of the housing to exert pressure onto the tape as the tape dispenser is operated, forcing the tape in contact with the dispensing surface. Cutting means are associated with the dispensing means, and triggering means are operatively connected to the cutting means to reciprocably actuate the cutting means between a non-operative position and an operative position to cut the tape after a desired length of tape has been dispensed onto the dispensing surface. After the tape has been severed, the end of the tape on the roll lies adjacent the dispensing means so that the single handed tape dispenser is immediately ready for further use and does not require a second hand to locate and place the end of the tape before the dispenser can again be used.

The dispensing means may include at least one roller mounted in the dispensing end of the housing. Tape to be dispensed passes between the roller and the dispensing surface, and the cutting means is operated in spaced juxtaposition with the roller.

The triggering means preferably comprises a spring return trigger mechanism, and blades having varied cutting edges necessitated by the type of pressure sensitive adhesive tape being dispensed are also provided.

The single handed tape dispenser of this invention is relatively simple in construction and is truly a single handed tape dispenser which does not require the use of a second hand to orient the end of the tape before the dispenser operation begins.

BRIEF DESCRIPTION OF THE DRAWING

FIG. 1 is a partial cut away side elevation of a single handed tape dispenser according to this invention.

FIG. 2 is a partial side elevation of the cutting means.

FIG. 2a is a front elevation of one embodiment of the cutting means which comprises a blade having serrated teeth.

FIG. 2b is a front elevation of another embodiment of the cutting means which comprises a blade having a guillotine edge.

FIG. 2c is a front elevation of a further embodiment of the cutting means which comprises a blade having a V-shape.

FIG. 3 is an enlarged, partial cross-sectional, side elevation of the dispenser at the beginning stages of dispensing tape onto a dispensing surface.

FIG. 3a is an enlarged, partial cross-sectional, side elevation of the dispenser when the cutting means is in the operative position.

FIG. 4 is an end elevation of the tape dispenser as seen from the dispensing end.

DESCRIPTION OF THE PREFERRED EMBODIMENTS

The tape dispenser 10 of this invention comprises a housing 11, dispensing means 12, cutting means 13 and trigger means 14.

The housing 11 is generally gun shaped, having a tape storage reservoir 15, a handle 16 and a dispensing end 18. The roll of tape 19 is rotatably mounted within the tape storage reservoir 15 by means of a pin 20 which passes through the housing and the center of the roll 19 and is held in place by the cotter pin 21. The rear end 15a of the storage reservoir 15 is open and, as will be more fully explained hereinafter, aids in replacing the roll of tape 19 after all of the tape thereon has been dispensed on the dispensing surface. Preferably, the inside of the storage reservoir 15 is substantially the same width as the roll of tape 19. This, of course, provides for frictional contact between the roll of tape 19 and the inside surface of the storage reservoir 15 when the tape is being dispensed, and, as will also be more fully explained hereinafter, precludes back roll of the tape and aids in maintaining the end 19a of the roll of tape 19 in the tape dispensing position.

The dispensing end 18 of the housing 11 comprises a forward extension of the storage reservoir 15. The dispensing end has a forwardly extending flat surface 18a in which the dispensing means 12 is mounted. The dispensing means 12 includes at least one rotatable roller, and preferably includes the rollers 22a and 22b, which are rotatably mounted in spaced relation. The rib 23 is mounted beneath and slightly rearwardly of the roller 22b, and the end 19a of the roll of tape 19 passes between the rib 23 and the roller 22b, resting upon the rib 23 and lying adjacent the roller 22b when the dispenser 10 is not in operation.

Mated slits 24, in either side of the dispensing end 18 and in close juxtaposition with the roller 22b, receive the cutting means 13. As can be seen from FIG. 2, the cutting means 13 comprises a blade having a cutting edge 13a angularly disposed from the portion 13b which is received by the mated slits 24. The cutting edge 13a may be any suitable knife edge. However, it has been found that certain cutting edges are preferable. For example, the serrated teeth cutting edge 25 of FIG. 2a and the guillotine cutting edge 26 of FIG. 2b work extremely well. Additionally, if the pressure sensitive adhesive tape which is to be dispensed is a fiber tape, the V-shaped cutting edge 27 is most suitable. As can be seen from FIG. 2c, the V-shaped cutting edge 27 comprises a central forward point 27a and rearward extending edges 27b.

The trigger means 14 comprises generally a spring return trigger mechanism which includes a bifurcated yoke 28, mating arms 29 and spring means 30. The tape storage reservoir 15 of the housing 11 is rotatably mounted between the bifurcations 28a of the yoke. Preferably, the bifurcations 28a are rotatably connected to the storage reservoir 15 by use of the same pin 20 and cotter pin 21 which rotatably mount the roll of tape 19 within the tape storage reservoir 15.

One end of each mating arm 29 is rotatably joined with one end of one bifurcation 28a, and the opposite end of each mating arm 29 is fixed to the portion 13b of the cutting means 13, which is slidably received within the mating slits 24 in the dispensing end 18 of the housing 11.

The spring means 30 is attached at one end to the housing 11 and at the opposite end to the portion 13b of the cutting means 13. As can be seen, the spring means 30 normally biases the portion 13b of the cutting means 13 within the mating slits 24, normally retaining the base 28b of the bifurcated yoke 28 at a distance from the handle 16.

In operation, a roll of pressure sensitive adhesive tape 19 is placed within the tape storage reservoir 15 by withdrawing the cotter pin 21 from the pin 20 and inserting the pin 20 through the aperture in the center of the roll 19. The end of the tape 19a is then threaded between the rib 23 and the roller 22b. The end of the tape 19a and the roller 22b are then placed against the dispensing surface 31 and the tape dispenser 10 is pulled by the handle 16, as shown in FIG. 3. This causes the tape to be dispensed on the dispensing surface 31 as the roll of tape 19 rotates. After the end of the tape 19a passes beneath the roller 22a, the tape dispenser 10 is pivoted so that the roller 22a contacts the tape being dispensed on the dispensing surface 31, as shown in FIG. 3a. While two rollers 22a and 22b are not absolutely necessary, it has been found that the pressure sensitive adhesive tape is more firmly pressed against the dispensing surface 31 when the tape dispenser 10 is pivoted and the roller 22a contacts the tape which is being dispensed.

It should be pointed out that when the tape dispenser 10 is pivoted upon the roller 22a, the handle 16 is preferably substantially parallel with the dispensing surface 31. This, of course, enables a better utilization of the force necessary to dispense the tape from the roll 19.

After a desired amount of tape has been dispensed from the roll 19, the base 28b of the bifurcated yoke 28 is depressed toward the handle 16. This operation causes the cutting means 13, the portion 13b of which is normally fully biased within the mating slits 24, to move from an inoperative position to an operative position, as shown in FIG. 3a. As the tape dispenser 10 continues to move, the cutting edge 13a of the cutting means 13 severs the tape, and the dispensing operation is complete when the roller 22a passes that portion of the tape which has been severed.

As can be seen from FIG. 3a, the cutting edge 13a of the cutting means 13 is preferably substantially parallel with the dispensing surface when the cutting means 13 is in the operative position. This, of course, achieves the quickest and most efficient severing of the tape.

It should be pointed out that after a desired amount of tape has been dispensed from the roll 19 onto the dispensing surface 31 and the tape severed, the new end 19a of the roll of tape 19 slightly curls around the roller 22b so as to lie adjacent therewith. The rib 23 assures that the curled end 19a will lie adjacent the roller 22b by adding support to the tape at a position in close proximity to the end 19a. Additionally, the frictional movement between the roll of tape 19 and the inside surface of the storage reservoir 15 when the tape is being dispensed precludes back roll of the tape and aids in maintaining the end 19a of the roll of tape 19 adjacent the roller 22b.

It should be emphasized that the tape dispenser of this invention is always available to dispense pressure sensitive adhesive tape onto a dispensing surface without necessitating searching for the end of the roll of tape and aligning it in a certain manner before the dispensing operation may begin.

While certain preferred embodiments of the invention have been specifically illustrated and described, it is understood that the invention is not limited thereto, as many variations will be apparent ot those skilled in the art, and the invention is to be given its broadest interpretation within the terms of the following claims.

The embodiments of the invention in which an exclusive property or privilege is claimed are defined as follows:

1. A tape dispenser operable with one hand to dispense pressure sensitive adhesive tape from a roll onto a surface to be taped, by pulling said dispenser therealong, said dispenser comprising:
  (a) a gun shaped housing having a handle which is substantially parallel to said surface when said tape is being dispensed thereon, a tape storage reservoir in which said roll of tape is rotatably mounted, the inside surface of said tape storage reservoir being in frictional contact with said roll of tape, whereby back roll of said tape is precluded, and a dispensing end comprising a forward extension of said storage reservoir including a forwardly extending flat surface, said forwardly extending flat surface being nonparallel with said handle and thus with said surface when said tape is being dispensed;
  (b) dispensing means associated with said dispensing end to exert pressure on said tape as said tape dispenser is operated so as to force said tape in contact with the dispensing surface, said dispensing means including at least first and second rollers rotatably mounted in spaced relation along said forwardly extending flat surface of said dispensing end, a plane through the axes of said rollers being parallel to said forwardly extending flat surface, and a supporting rib mounted in said dispensing end beneath and slightly rearwardly of the lower one of said rollers, said supporting rib providing support for the tape as it is being dispensed and aiding the end of said roll of tape in lying adjacent the lower one of said rollers when said tape is not being dispensed;
  (c) cutting means associated with said dispensing means, said cutting means being mounted in mated slits in said dispensing end and being operable between said first and second rollers; and
  (d) triggering means associated with said cutting means, said triggering means comprising a bifurcated yoke, said tape reservoir of said housing being rotatably mounted between the bifurcations of said yoke such that the base of said yoke is spaced from said handle, arms joining the bifurcations of said yoke to said cutting means, and spring means joined at one end to said housing and at the opposite end to said cutting means, whereby said cutting means is reciprocably actuated between a non-operative position and an operative position when the base of said yoke is depressed toward said handle by the operator's forefinger so as to cut said tape after a desired length of tape has been dispensed onto said surface.

2. The tape dispenser according to claim 1, wherein said cutting means comprises a blade having a cutting edge of serrated teeth.

3. The tape dispenser according to claim 1, wherein said cutting means comprises a blade having a guillotine cutting edge.

4. The tape dispenser according to claim 1, wherein said cutting means comprises a blade having a V-shaped cutting edge, said cutting edge having a central forward point and rearward extending edges.

5. The tape dispenser according to claim 1, wherein said cutting means comprises a blade having a cutting edge which is substantially parallel with said dispensing surface when said tape dispenser is pivoted on said second roller and said blade is in the operative position.

References Cited

UNITED STATES PATENTS

| 1,044,190 | 11/1912 | Kohart | 156—526 |
| 2,606,682 | 8/1952 | Cutter | 156—523 |
| 3,131,109 | 4/1964 | Auld et al. | 156—526 |

FOREIGN PATENTS

| 668,492 | 8/1963 | Canada. |
| 712,414 | 10/1941 | Germany. |
| 872,896 | 7/1961 | Great Britain. |

BENJAMIN A. BORCHELT, Primary Examiner

J. M. HANLEY, Assistant Examiner

U.S. Cl. X.R.

156—577